(12) United States Patent
Hattori et al.

(10) Patent No.: US 10,031,154 B2
(45) Date of Patent: *Jul. 24, 2018

(54) INERTIAL FORCE SENSOR

(71) Applicant: PANASONIC INTELLECTUAL PROPERTY MANAGEMENT CO., LTD., Osaka (JP)

(72) Inventors: Isao Hattori, Fukui (JP); Takeshi Uemura, Osaka (JP); Satoshi Ohuchi, Hyogo (JP); Yasunobu Tsukio, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/667,178

(22) Filed: Aug. 2, 2017

(65) Prior Publication Data

US 2017/0356926 A1 Dec. 14, 2017

Related U.S. Application Data

(63) Continuation of application No. 14/378,095, filed as application No. PCT/JP2013/000864 on Feb. 18, 2013, now Pat. No. 9,753,054.

(30) Foreign Application Priority Data

Feb. 21, 2012 (JP) .................................. 2012-034614
Feb. 28, 2012 (JP) .................................. 2012-041643

(51) Int. Cl.
*G01P 15/18* (2013.01)
*G01P 15/08* (2006.01)
(Continued)

(52) U.S. Cl.
CPC .......... *G01P 15/08* (2013.01); *G01C 19/5776* (2013.01); *G01P 15/036* (2013.01);
(Continued)

(58) Field of Classification Search
CPC ..................................................... G01P 15/125
(Continued)

(56) References Cited

U.S. PATENT DOCUMENTS 4,705,388 A 11/1987 Huntjens et al.
2006/0053908 A1* 3/2006 Ishigami ............. B60C 23/0408
73/866.1

(Continued)

FOREIGN PATENT DOCUMENTS

JP 61-256372 A 11/1986
JP 2001-057011 A 2/2001
(Continued)

OTHER PUBLICATIONS

Isao, Hattori et. Al 'Inertial Force Sensor' PCT/JP2013/000863, Written Opinion of the International Searching Authority, dated Dec. 3, 2013, 9 pgs.
(Continued)

*Primary Examiner* — Clayton E Laballe
*Assistant Examiner* — Kevin Butler
(74) *Attorney, Agent, or Firm* — McDermott Will & Emery LLP

(57) ABSTRACT

An inertial force sensor has a first sensor element, a second sensor element, a first signal processor, a second signal processor, and a power controller. The first sensor element converts a first inertial force to an electric signal, and the second sensor element converts a second inertial force to an electric signal. The first signal processor is connected to the first sensor element, and outputs a first inertial force value. The second signal processor is connected to the second sensor element, and outputs a second inertial force value. The power controller is connected to the first signal proces-
(Continued)

sor and the second signal processor, and changes power supplied to the second signal processor based on the first inertial force value.

20 Claims, 14 Drawing Sheets

(51) Int. Cl.
  *G01C 19/5776* (2012.01)
  *G01P 15/125* (2006.01)
  *G01P 15/135* (2006.01)
  *G01P 15/03* (2006.01)
(52) U.S. Cl.
  CPC ........ *G01P 15/0802* (2013.01); *G01P 15/125* (2013.01); *G01P 15/135* (2013.01); *G01P 15/18* (2013.01)
(58) Field of Classification Search
  USPC ...................................................... 73/514.01
  See application file for complete search history.

(56) References Cited

U.S. PATENT DOCUMENTS

| | | | |
|---|---|---|---|
| 2009/0207960 A1* | 8/2009 | Takahashi | H04L 7/033 375/371 |
| 2010/0033424 A1* | 2/2010 | Kabasawa | G01C 17/28 345/156 |
| 2012/0013354 A1* | 1/2012 | Bowler | G01N 27/226 324/664 |
| 2012/0023354 A1* | 1/2012 | Chino | G01P 13/00 713/323 |

FOREIGN PATENT DOCUMENTS

| | | |
|---|---|---|
| JP | 2002-350139 A | 12/2002 |
| JP | 2007-322347 A | 12/2007 |
| JP | 2009-040225 A | 2/2009 |
| JP | 2009-194741 A | 8/2009 |
| JP | 2010-152587 A | 7/2010 |
| JP | 2010-166607 A | 7/2010 |
| JP | 2012-026824 A | 2/2012 |
| WO | 2005/019790 A1 | 3/2005 |

OTHER PUBLICATIONS

Isao, Hattori et. Al 'Inertial Force Sensor' PCT/JP2013/000863, International Search Report, Dec. 3, 2013, 2 pgs.

International Search Report issued in International Application No. PCT/JP2013/000864 dated Mar. 12 2013, with English Translation.

* cited by examiner

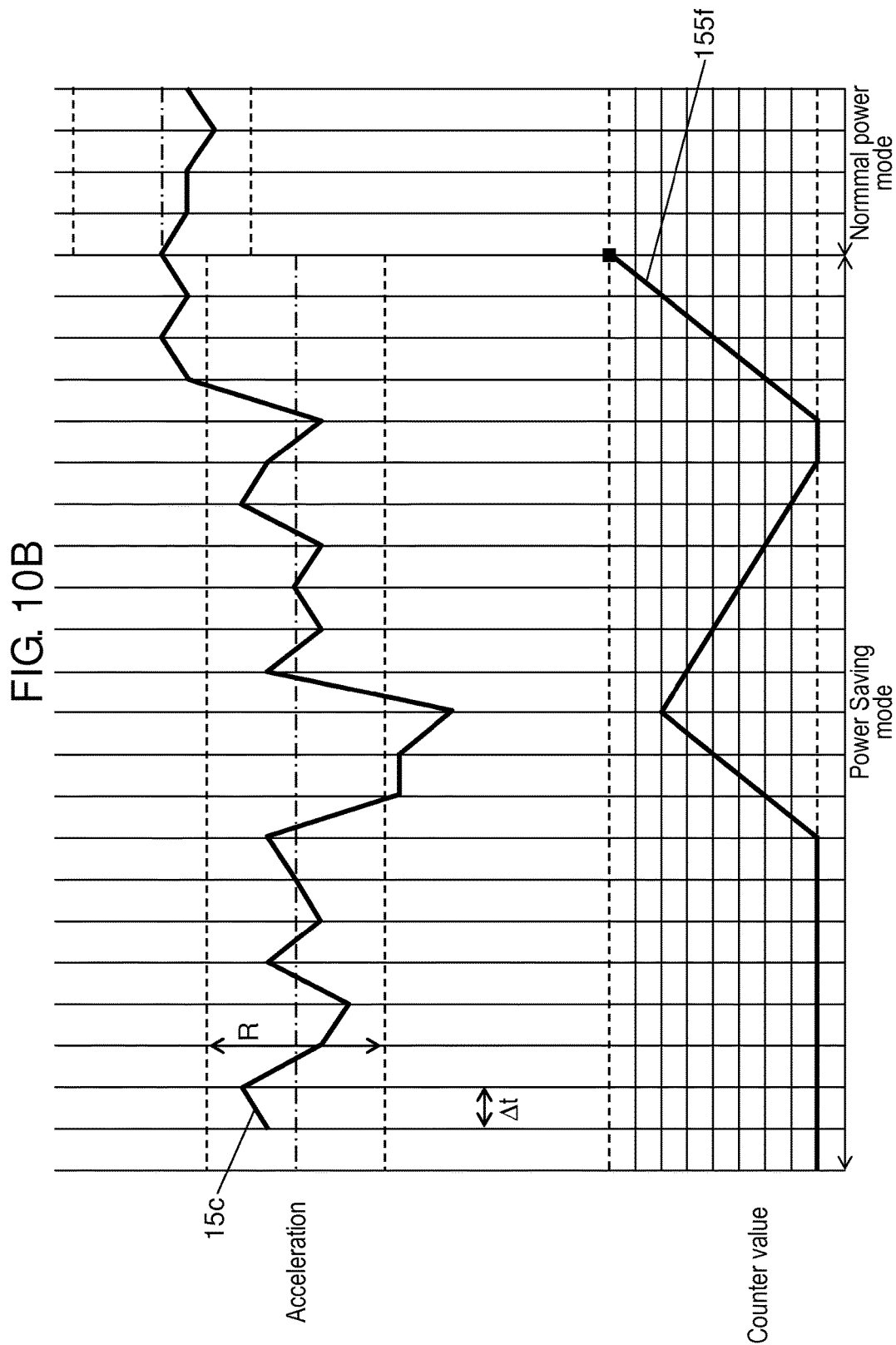

INERTIAL FORCE SENSOR

RELATED APPLICATIONS

This application is a continuation application of U.S. patent application Ser. No. 14/378,095, filed on Aug. 11, 2014, which is a U.S. National Phase under 35 U.S.C. § 371 of International Patent Application No. PCT/JP2013/000864, filed on Feb. 18, 2013, which in turn claims the benefit of Japanese Application No. 2012-034614, filed on Feb. 21, 2012 and Japanese Application No. 2012-041643, filed on Feb. 28, 2012, the entire disclosures of which Applications are incorporated by reference herein.

TECHNICAL FIELD

The present invention relates to an inertial force sensor used in digital cameras, mobile terminals, robots, and other various electronic devices.

BACKGROUND

A conventional inertial force sensor will be described with reference to FIG. 18. FIG. 18 is a block diagram of conventional inertial force sensor 1. Inertial force sensor 1 has vibrator 2, self-excited vibration circuit 3, detection circuit 4, power source control device 5, and trigger signal input unit 6. Self-excited vibration circuit 3 causes a drive vibration of vibrator 2. Detection circuit 4 is connected to vibrator 2 and outputs an inertial force value. Power source control device 5 controls power supplied to self-excited vibration circuit 3 and detection circuit 4. Trigger signal input unit 6 is connected to power source control device 5.

When detection circuit 4 does not detect the amount of inertia, power source control device 5 reduces power to be supplied to a part of self-excited vibration circuit 3 and detection circuit 4. Also, power source control device 5 restores the power supplied to the part being supplied with the reduced power to a rated power based on a trigger input from trigger signal input unit 6.

SUMMARY

The present invention is an inertial force sensor which can autonomously perform shift to a power saving mode and restoration to a normal power mode without requiring a restoration operation by a user or an external circuit. An inertial force sensor of the present invention has a first sensor element, a second sensor element, a first signal processor, a second signal processor, and a power controller. The first sensor element converts a first inertial force to an electric signal, and the second sensor element converts a second inertial force different from the first inertial force to an electric signal. The first signal processor is connected to the first sensor element, and outputs a first inertial force value. The second signal processor is connected to the second sensor element, and outputs a second inertial force value. The power controller is connected to the first signal processor and the second signal processor, and changes power to be supplied to the second signal processor based on the first inertial force value.

With the above-described configuration, it is possible to autonomously perform transition to a power saving mode and restoration to a normal power mode without requiring a restoration operation by a user or an external circuit.

BRIEF DESCRIPTION OF DRAWINGS

FIG. 10B is a diagram showing an example of control by a power controller used in the inertial force sensor according to the first embodiment of the present invention.

DETAILED DESCRIPTION

Figure 18:
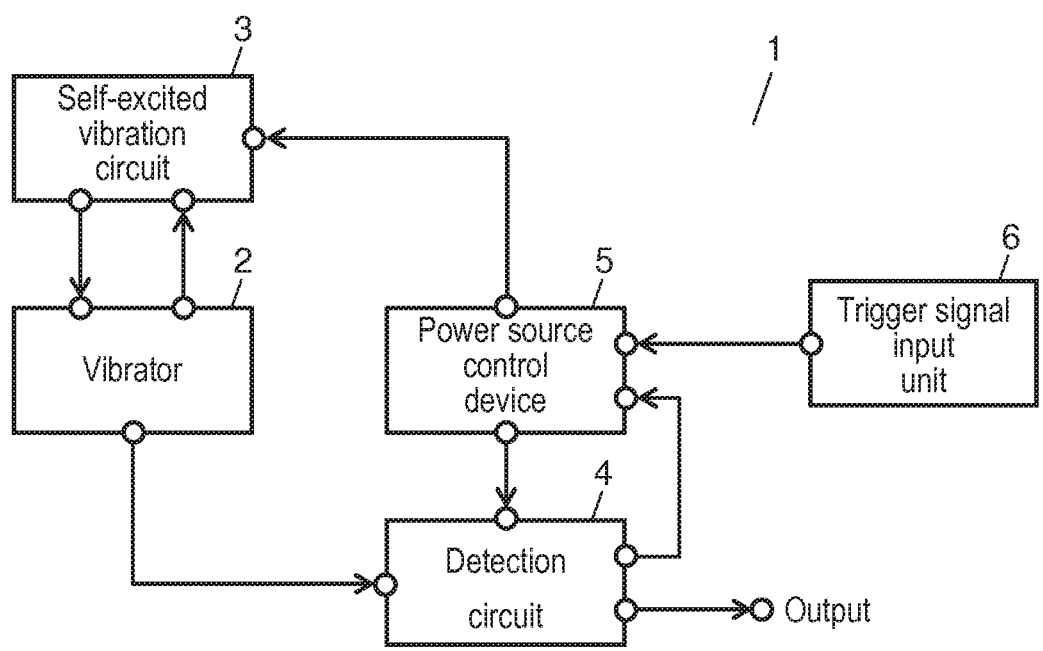
FIG. 18 is a block diagram of a conventional inertial force sensor.

Before describing embodiments of the present invention, problems of the conventional inertial force sensor shown in FIG. 18 will be described. Inertial force sensor 1 shifts to a power saving mode when the detected amount of inertia reduces. However, in order to restore the inertial force sensor 1 to the normal power state from the power saving mode, a trigger input is required. Therefore, it is necessary for restoring the inertial force sensor 1 to the normal power state to give it a trigger input by an operation such as pressing a button by a user using the electronic device.

First Embodiment

Figure 1:
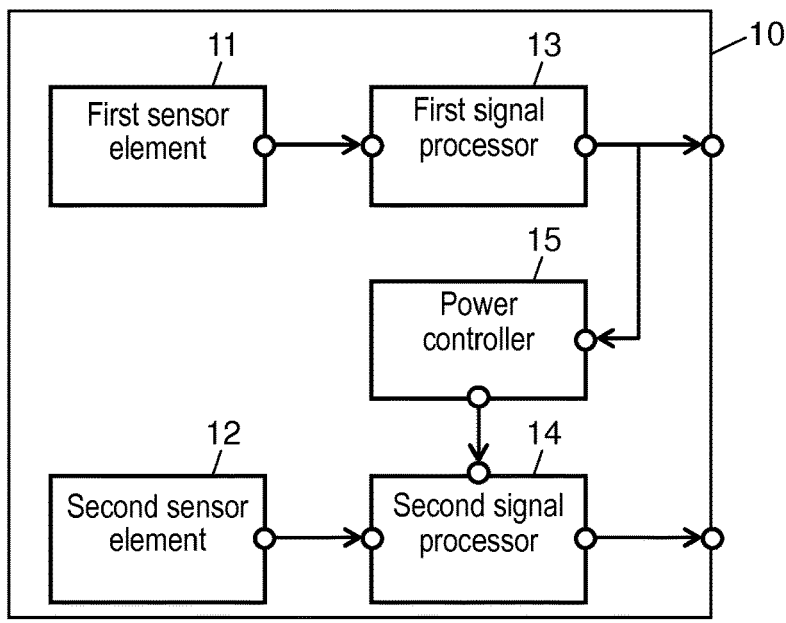
FIG. 1 is a block diagram of an inertial force sensor according to a first embodiment of the present invention.

FIG. 1 is a block diagram of inertial force sensor 10 according to a first embodiment of the present invention.

Inertial force sensor 10 has first sensor element 11, second sensor element 12, first signal processor 13, second signal processor 14, and power controller 15. First sensor element 11 converts a first inertial force to an electric signal. Second sensor element 12 converts a second inertial force different from the first inertial force to an electric signal. First signal processor 13 is connected to first sensor element 11, and outputs a first inertial force value. Second signal processor 14 is connected to second sensor element 12, and outputs a second inertial force value. Power controller 15 is connected to first signal processor 13 and second signal processor 14, and changes power to be supplied to second signal processor 14 based on the first inertial force value.

With this configuration, inertial force sensor 10 can autonomously allow second signal processor 14 to shift to a power saving mode and restore to a normal power mode without requiring a restoration operation by a user or an external circuit (not shown).

More specifically, when a user picks up a device such as a mobile terminal equipped with inertial force sensor 10 in a power saving mode, first sensor element 11 mounted inside the device detects a first inertial force and converts it to an electric signal. Based on this electric signal, first signal processor 13 outputs a first inertial force value to power controller 15. Based on this first inertial force value, power controller 15 increases power to be supplied to second signal processor 14. As a result, second signal processor 14 becomes a normal power mode.

Figure 2:
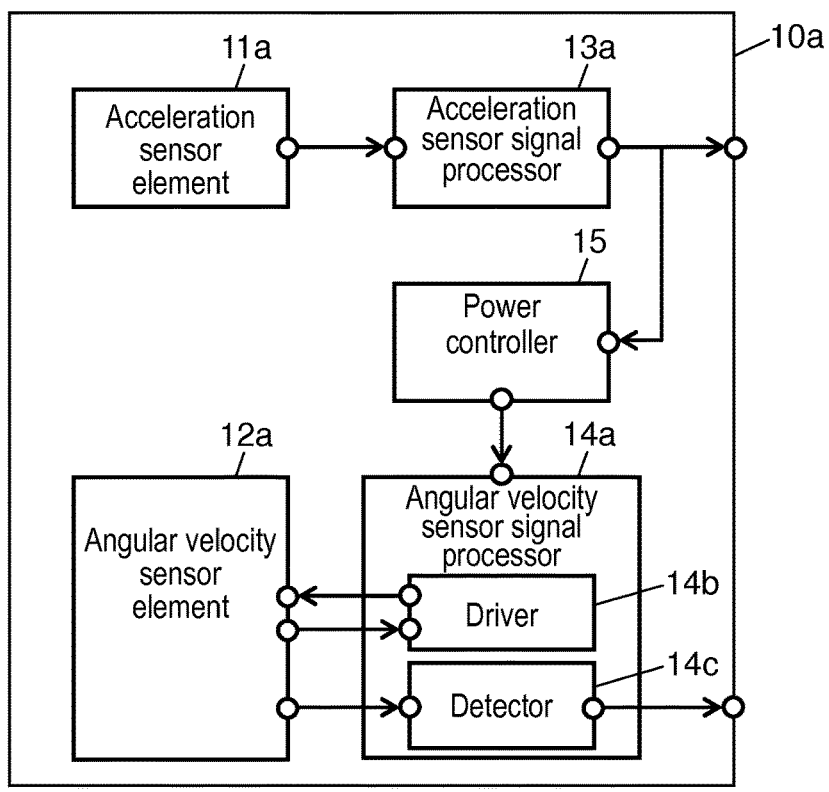
FIG. 2 is a block diagram of an example of the inertial force sensor shown in FIG. 1.

Hereinafter, specific configuration examples and operation examples of inertial force sensor 10 will be described with reference to FIG. 2 through FIG. 10B. FIG. 2 shows an example in which acceleration sensor element 11a is used as first sensor element 11, and angular velocity sensor element 12a is used as second sensor element 12.

Acceleration sensor element 11a is connected to acceleration sensor signal processor 13a. Acceleration sensor element 11a has a flexible part (not shown). Acceleration sensor signal processor 13a detects a displacement of the flexible part caused by acceleration, and outputs it as an acceleration value.

Angular velocity sensor element 12a is connected to angular velocity sensor signal processor 14a. Angular velocity sensor signal processor 14a has driver 14b and detector 14c. Driver 14b outputs a drive signal to cause a drive vibration of angular velocity sensor element 12a, and receives a monitor signal from angular velocity sensor element 12a to perform a feedback control so as to maintain the amplitude of the drive vibration to be constant. Angular velocity sensor element 12a has a flexible part (not shown) which is displaced due to Coriolis force generated in a direction of an axis orthogonal to a drive vibration axis and an angular velocity applied axis. Detector 14c detects a detection signal generated due to the displacement of the flexible part by a monitor signal inputted from drive part 14b, and integrates the detected signal by a low-pass filter to produce an angular velocity value.

Power controller 15 shifts the inertial force sensor 10 to the power saving mode by reducing the power to be supplied to angular velocity sensor signal processor 14a based on the acceleration value outputted from acceleration sensor signal processor 13a. Also, power controller 15 restores the inertial force sensor 10 to the normal power mode by increasing the power to be supplied to angular velocity sensor signal processor 14a based on the acceleration value outputted from acceleration sensor signal processor 13a.

Angular velocity sensor signal processor 14a detects an angular velocity by causing the drive vibration of angular velocity sensor element 12a. On the other hand, acceleration sensor signal processor 13a does not cause any drive vibration of acceleration sensor element 11a. Accordingly, angular velocity sensor signal processor 14a consumes more power than acceleration sensor signal processor 13a. Power controller 15 reduces the power to be supplied to angular velocity sensor signal processor 14a consuming larger amount of power based on the acceleration value outputted from acceleration sensor signal processor 13a consuming smaller amount of power. This operation makes it possible to largely reduce power consumption.

Figure 3:
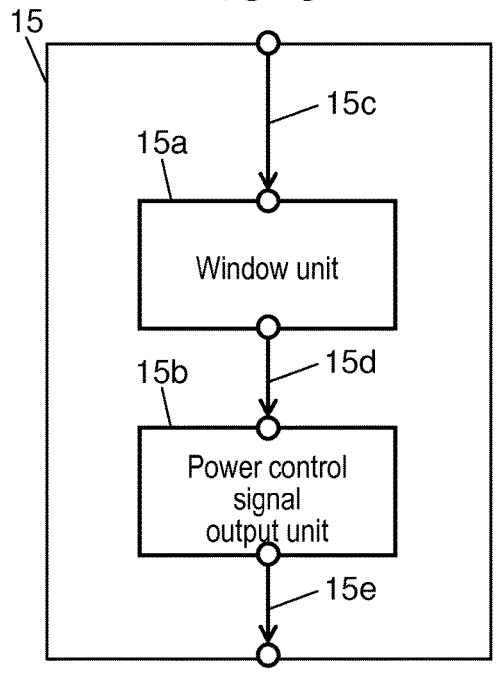
FIG. 3 is a block diagram showing a configuration example of a power controller used in the inertial force sensors shown in FIG. 1 and FIG. 2.

FIG. 3 is a block diagram showing a configuration example of power controller 15. Power controller 15 has window unit 15a (also referred to as, a first unit 15a) and power control signal output unit 15b (also referred to as, a second unit 15b). Acceleration value 15c outputted from acceleration sensor signal processor 13a is inputted to window unit 15a. Window unit 15a outputs status signal 15d (also referred to as, a first status signal 15d) indicating a stationary state when acceleration value 15c is within a specified range with a center defined by a reference value, and otherwise outputs status signal 15d (also referred to as, a second status signal 15d) indicating an operating state. Power control signal output unit 15b outputs control signal 15e (also referred to as, a first control signal 15e) for shifting to a power saving mode when angular velocity sensor signal processor 14a is in a normal power mode and status signal 15d indicates the stationary state. Also, power control signal output unit 15b outputs control signal 15e (also referred to as, a second control signal 15d) for shifting to the normal power mode when angular velocity sensor signal processor 14a is in the power saving mode and status signal 15d indicates the operating state.

Figure 4:
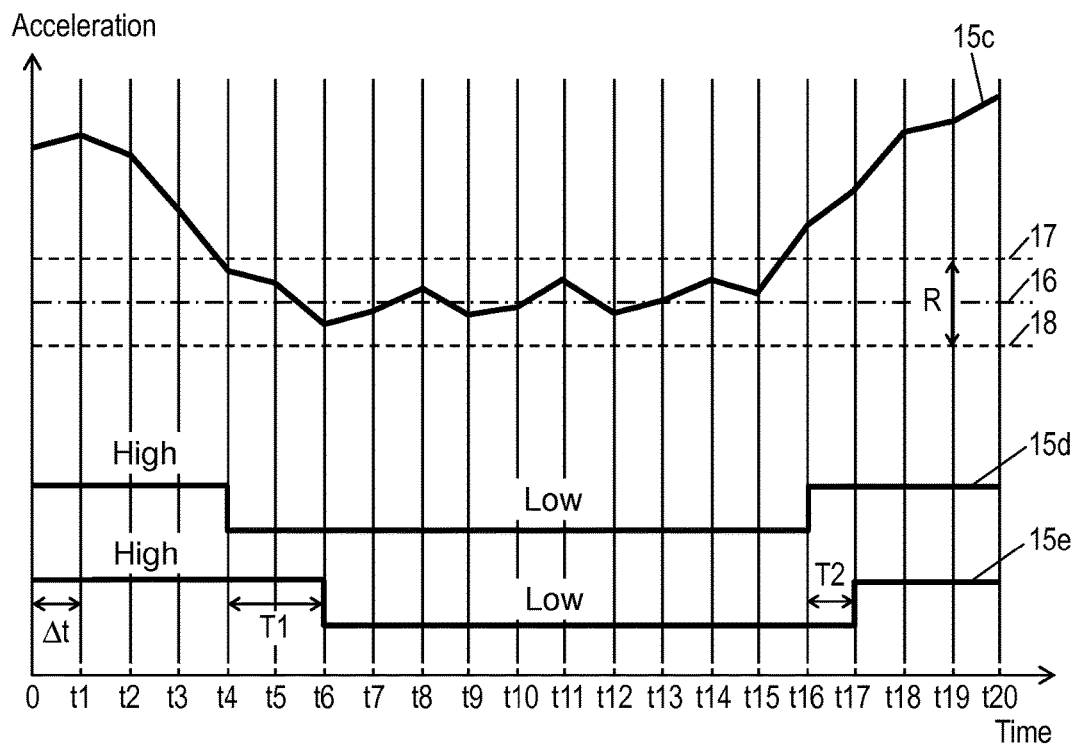
FIG. 4 is a diagram showing an example of control by the power controller shown in FIG. 3.

FIG. 4 is a diagram showing an example of control by power controller 15. The horizontal axis indicates time. The upper half of the vertical axis indicates acceleration value, and the lower half of the vertical axis indicates "High" and "Low" states of status signal 15d and control signal 15e. Acceleration value 15c is outputted from acceleration sensor signal processor 13a. Reference value 16, upper threshold value 17 and lower threshold value 18 are set in window unit 15a. Window unit 15a outputs status signal 15d of value "Low" indicating a stationary state when acceleration value 15c is within range R between upper threshold value 17 and lower threshold value 18, and otherwise outputs status signal 15d of value "High" indicating an operating state. A value above reference value 16 indicates acceleration in a positive direction with respect to a given direction, and a value below reference value 16 indicates acceleration in a negative direction with respect to the same given direction.

In the example shown in FIG. 4, acceleration value 15c is larger than upper threshold value 17 in the period of t=0 to t3, included within range R with a center defined by reference value 16 between upper threshold 17 and lower threshold 18 in the period of t=t4 to t15, and larger than upper threshold value 17 in the period of t=t16 to t20. Accordingly, status signal 15d becomes the "Low" state indicating the stationary state in the period of t=t4 to t15, in which acceleration value 15c is within range R, and the "High" state indicating the operating state in the periods of t=0 to t3 and t=t16 to t20, in which acceleration value 15c is not within range R.

In the present embodiment, power controller 15 performs reading of acceleration value 15c, comparison of the same to range R and production of status signal 15d and control signal 15e at specified period Δt.

Control signal 15e shown in FIG. 4 is outputted from power control signal output unit 15b shown in FIG. 3, and changes, in the example shown in FIG. 4, from the "High" state to the "Low" state at t=t6 to shift to the power saving mode. It should be noted here that control signal 15e is changed to the "Low" state when status signal 15d has been in the "Low" state for first period T1 so as to prevent the power mode from being shifted to the power saving mode in error due to a noise. Also, control signal 15e is changed from the "Low" state to the "High" state at t=t17 to shift to the normal power mode. Similarly to the case of changing from the "High" state to the "Low" state, control signal 15e is changed to the "High" state when status signal 15d has been in the "High" state for second period T2. However, second period T2 is set shorter than first period T1. With this configuration, it is possible to shorten the time necessary for restoring from the power saving mode to the normal power mode. Also, second period T2 may be set to 0.

As described above, angular velocity sensor signal processor 14a is shifted to the power saving mode when the state in which acceleration value 15c is within range R has continued for first period T1. When the state in which acceleration value 15c is out of range R has continued for second period T2, angular velocity sensor signal processor 14a is shifted to the normal power mode.

In other words, power controller 15 reduces power to be supplied to angular velocity sensor signal processor 14a as a second signal processor, when the power supplied to angular velocity sensor signal processor 14a is a first value and a state in which acceleration value 15c as a first inertial force value is within specified range R with a center defined by reference value 16 has continued for first period T1. Also, power controller 15 increases the power to be supplied to angular velocity sensor signal processor 14a when the power supplied to angular velocity sensor signal processor 14a is a second value smaller than the first value and a state in which acceleration value 15c falls outside specified range R with a center defined by reference value 16 has continued for second period T2.

In addition, by setting first period T1 to be longer than second period T2, it is possible to reduce malfunctions due to noises and to shorten the restoring time.

Further, power controller 15 may prolong first period T1 during a certain period of time after shifted from the power saving mode to the normal power mode. This can make angular velocity sensor signal processor 14a to have less incidence of shifting to the power saving mode immediately after being restored to the normal power mode.

Further, if acceleration value 15c falls outside range R, power controller 15 may expand range R by raising upper threshold 17 or lowering lower threshold 18. This makes it possible to prevent the power to be supplied to angular velocity sensor signal processor 14a from being reduced after acceleration is actually applied.

These first period T1 and second period T2 can be measured by a counter. Power controller 15 confirms acceleration value 15c every specified cycle (period) Δt, and also measures first period T1 and second period T2 by multiplying specified period Δt by the counter value. If acceleration value 15c is within range R, power controller 15 counts up a first counter value in specified cycle Δt, and, if the first counter value exceeds a first counter threshold value corresponding to first period T1, power controller 15 shifts angular velocity sensor signal processor 14a to the power saving mode. Also, if acceleration value 15c is out of range R, power controller 15 counts up a second counter value in specified cycle Δt, and, if the second counter value exceeds a second counter threshold value corresponding to second period T2, power controller 15 shifts angular velocity sensor signal processor 14a to the normal power mode. By measuring first period T1 and second period T2 in the manner using a counter as described above, time measurement is possible with a simple configuration. Further, first period T1 and second period T2 can be made variable. That is, first and second counter threshold values may be made externally settable.

In other words, power controller 15 confirms acceleration value 15c, which is a first inertial force value, in specified cycle Δt. Then, if the power supplied to angular velocity sensor signal processor 14a, which is a second signal processor, is a first value and if the number of times acceleration value 15c is within specified range R with a center defined by reference value 16 has reached a first specified number of times (the first counter threshold value), power controller 15 decreases the power to be supplied to angular velocity sensor signal processor 14a. On the other hand, if the power supplied to angular velocity sensor signal processor 14a is a second value smaller than the first value and if the number of times acceleration value 15c is out of specified range R with a center defined by reference value 16 has reached a second specified number of times (the second counter threshold value), power controller 15 increases the power to be supplied to angular velocity sensor signal processor 14a.

As described above, first period T1 may be made longer to prevent unintentional shift to the power saving mode, and the power saving mode may be rapidly shifted to the normal power mode to surely detect angular velocity. For this reason, it may be likely needed that first period T1 is in a minute order while second period T2 is in a microsecond order. A configuration that can respond to such setting will be described with reference to FIG. 5 to FIG. 6C.

Figure 5:
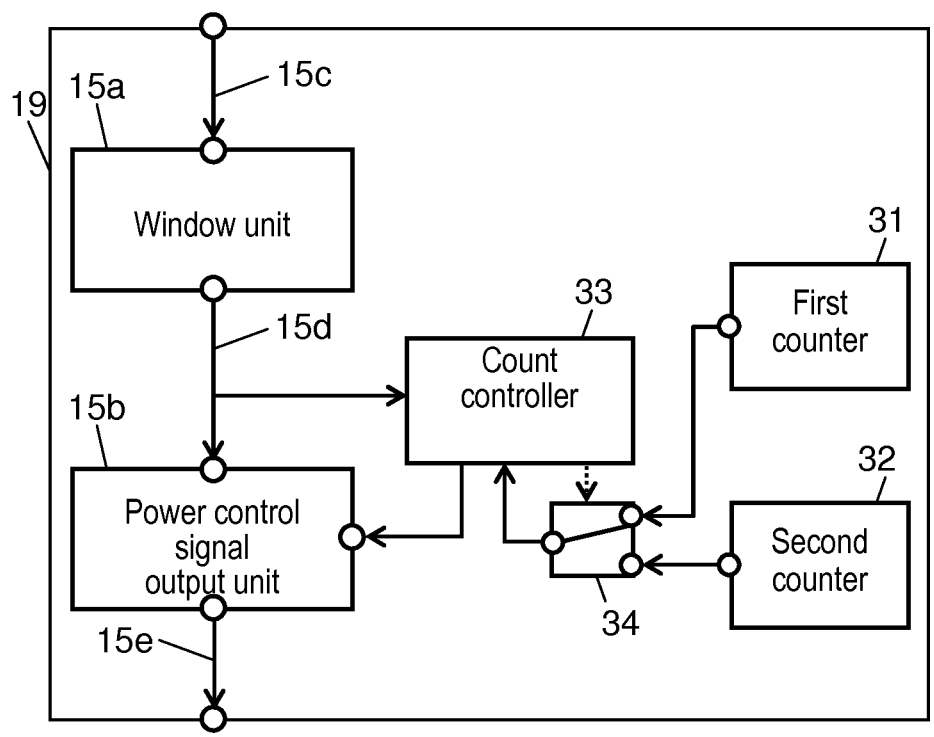
FIG. 5 is a block diagram showing a configuration of another power controller used in the inertial force sensor according to the first embodiment of the present invention.
Figure 6A:
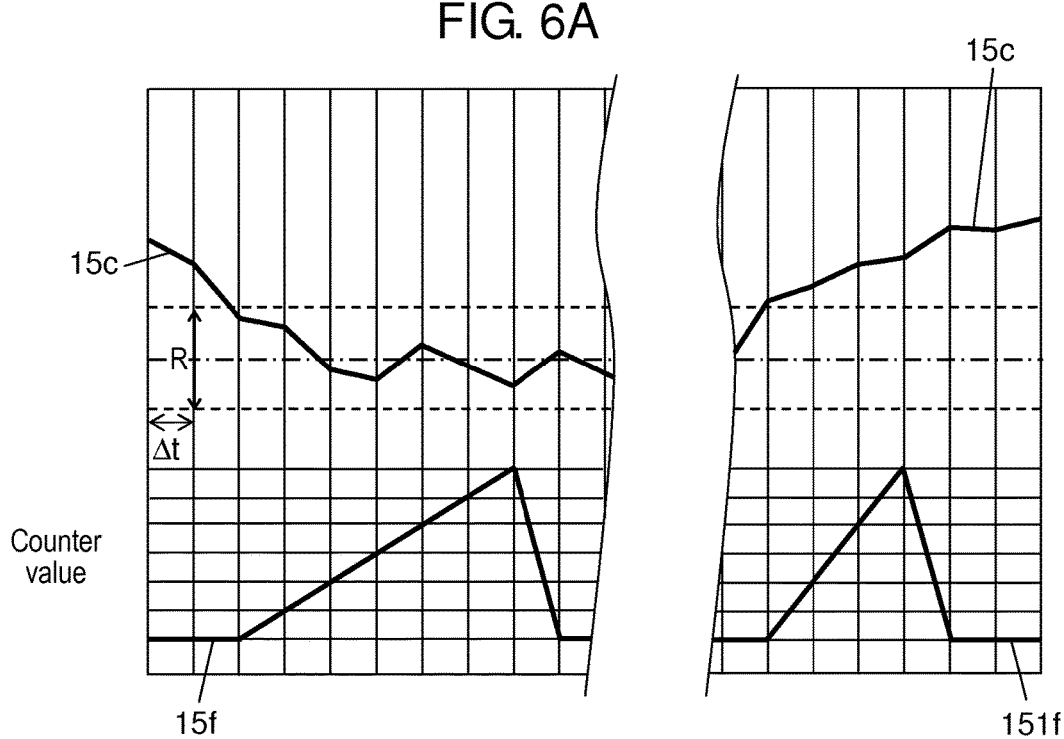
FIG. 6A is a diagram showing a counting method by a first counter and a second counter used in the inertial force sensor shown in FIG. 5.
Figure 6B:
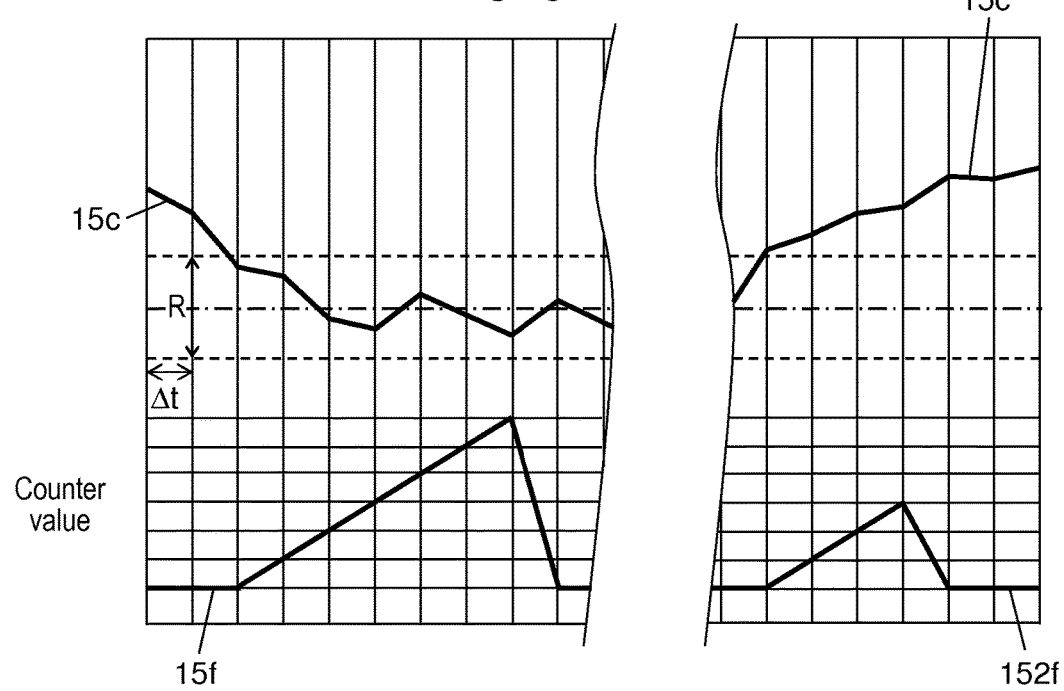
FIG. 6B is a diagram showing another counting method by the first counter and the second counter used in the inertial force sensor shown in FIG. 5.
Figure 6C:
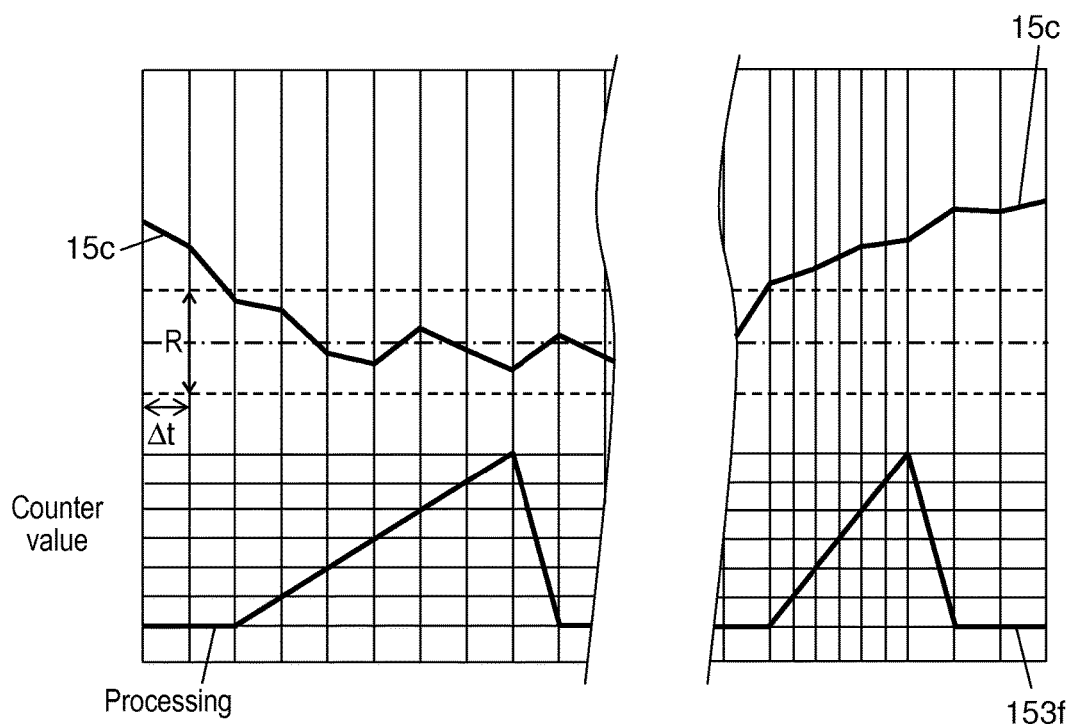
FIG. 6C is a diagram showing still another counting method by the first counter and the second counter used in the inertial force sensor shown in FIG. 5.

FIG. 5 is a block diagram showing a configuration of another power controller 19 used in inertial force sensor 10a. In addition to the configuration shown in FIG. 3, power controller 19 is further provided with first counter 31, second counter 32, count controller 33, and switching unit 34. In this configuration, first period T1 and second period T2 can be measured by first counter 31 and second counter 32. FIG. 6A to FIG. 6C are diagrams for explaining various count-up methods by first counter 31 and second counter 32.

Count controller 33 counts up the first counter value by first counter 31 if status signal 15d is in the "High" state and angular velocity value 15c is within range R. Then, when the first counter value exceeds the first counter threshold value corresponding to first period T1, angular velocity sensor signal processor 14a is shifted to the power saving mode. Since status signal 15d becomes the "Low" state at this time, counter controller 33 switches the connection state of switching unit 34 so that the second counter value can be counted up by second counter 32. Then, if angular velocity value 15c is out of range R, the second counter value is counted up in specified cycle (period) Δt. When the second counter value exceeds the second counter threshold value corresponding to the second period, angular velocity sensor signal processor 14a is shifted to the normal power mode.

In the method shown in FIG. 6A, first counter 31 increments first counter value 15f by 1 in specified cycle Δt, whereas second counter 32 increments second counter value 151f by 2 or more in specified cycle Δt. The first counter threshold value is the same as the second counter threshold value. Therefore, second period T2 can be made shorter compared to first period T1, so that rapid shift to the normal power mode is possible.

In other words, power controller 19 confirms acceleration value 15c every specified cycle (period) Δt. Then, if the power supplied to angular velocity sensor signal processor 14a is a first value and if the first counter value showing the number of times acceleration value 15c is within specified range R with a center defined by a reference value has reached a first specified number of times, power controller 19 decreases the power to be supplied to angular velocity sensor signal processor 14a. On the other hand, if the power supplied to angular velocity sensor signal processor 14a is a second value smaller than the first value and if the second counter value, which is obtained by multiplying the number of times acceleration value 15c is out of specified range R by a first natural number of 2 or more, has reached a second specified value, power controller 19 increases the power to be supplied to angular velocity sensor signal processor 14a.

In the method shown in FIG. 6B, first counter 31 and second counter 32 increment first counter value 15f and second counter value 152f, respectively, by 1 in specified cycle Δt. In this case, the second counter threshold value is set smaller than the first counter threshold value. In other words, the first counter threshold value is larger than the second counter threshold value. Accordingly, second period T2 can be made shorter compared to first period T1, so that rapid shift to the normal power mode is possible.

In the method shown in FIG. 6C, first counter 31 increments first counter value 15f by 1 in specified cycle Δt, whereas second counter 32 increments second counter value 153f by 1 in specified cycle Δt/2. The first counter threshold value is the same as the second counter threshold value. Accordingly, second period T2 can be made shorter compared to first period T1, so that rapid shift to the normal power mode is possible. In this case, however, it is necessary for first counter 31 and second counter 32 to use different reference clocks from each other.

In other words, if the power supplied to angular velocity sensor signal processor 14a is a first value, power controller 19 confirms acceleration value 15c every specified cycle (period) Δt, which is a first cycle, and, if the number of times acceleration value 15c is within specified range R with a center defined by a reference value has reached a first specified number of times, power controller 19 reduces the power to be supplied to angular velocity sensor signal processor 14a. On the other hand, if the power supplied to angular velocity sensor signal processor 14a is a second value smaller than the first value, power controller 19 confirms acceleration value 15c every a second cycle which is shorter than the first cycle, and, if the number of times acceleration value 15c is out of specified range R with a center defined by a reference value has reached a second specified number of times, power controller 19 increases the power to be supplied to angular velocity sensor signal processor 14a.

As described above, by using first counter 31 and second counter 32 and switching over them with switching unit 34, second period T2 can be made shorter than first period T1, so that rapid shift to the normal power mode is possible. It should be understood that count-up methods using first counter 31 and second counter 32 are not limited to the above-described three methods. For example, two or more of these methods may be combined.

Figure 7:
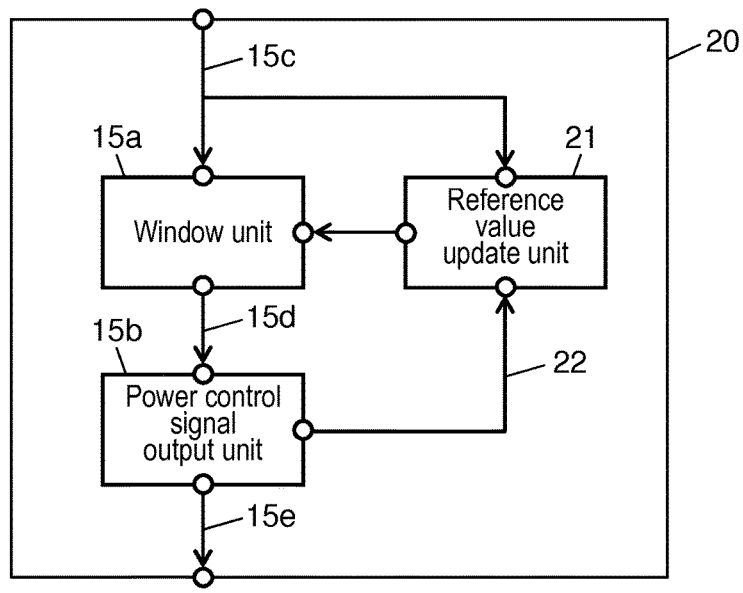
FIG. 7 is a block diagram showing a configuration of still another power controller used in the inertial force sensor according to the first embodiment of the present invention.
Figure 8:
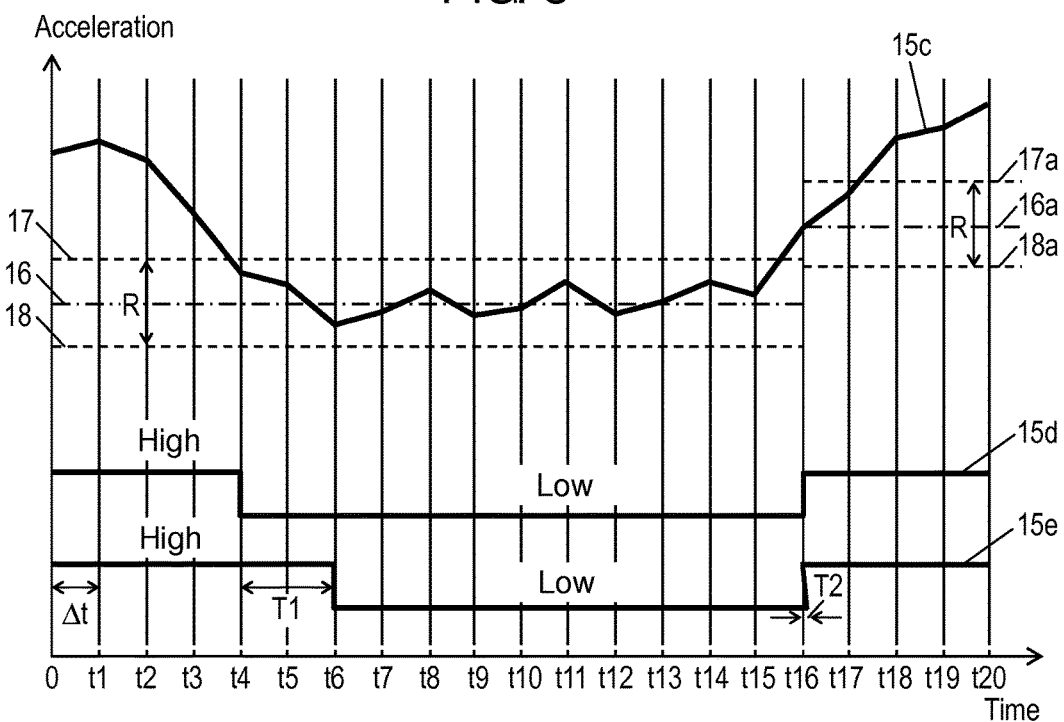
FIG. 8 is a diagram showing an example of control by the power controller shown in FIG. 7.

Next, a configuration for preventing malfunction caused by temperature changes or the like will be described with reference to FIGS. 7 and 8. FIG. 7 shows a configuration of still another power controller 20 according to the present embodiment. FIG. 8 shows an example of control by power controller 20. In addition to power controller 15 shown in FIG. 3, power controller 20 is further provided with reference value update unit 21.

If the state in which acceleration value 15c is out of range R with a center defined by reference value 16 has continued for second period T2, power controller 20 increases the power to be supplied to angular velocity sensor signal processor 14a, and updates reference value 16 of acceleration value 15c. In the configuration shown in FIG. 7, power control signal output unit 15b outputs update signal 22 to reference signal update unit 21 at a timing when power control signal output unit 15b outputs control signal 15e for shifting to the normal power mode. Upon receipt of update signal 22 from power control signal output unit 15b, reference value update unit 21 sets, as a new reference value of acceleration value 15c, reference value 16a for window unit 15a. With this configuration, the reference value can be updated as a value having removed offset components caused by temperature changes or the like.

In FIG. 8, second period T2 is set to 0. Acceleration value 15c becomes larger than upper threshold value 17 at t=t16. Accordingly, power control signal output unit 15b changes control signal 15e from the "Low" state to the "High" state, so that the power to be supplied to angular velocity sensor signal processor 14a is increased. At the same time, reference signal update unit 21 sets new reference value 16a to window unit 15a. Reference value 16a is equal to acceleration value 15c at t=t16. Also, new upper threshold value 17a and new lower threshold value 18a are set so that range R is maintained.

Although, in the present embodiment, new reference value 16a is set to be equal to acceleration value 15c at the timing of restoring from the power saving mode to the normal power mode (t=t16 in FIG. 8), it may be set to be equal to acceleration value 15c at a specified time earlier than such timing (for example, t=t14). In this case, although it is necessary to always store acceleration value 15c in a memory, the offset components can be corrected more precisely because of the use of acceleration value 15c detected before acceleration is applied to inertial force sensor 10.

Figure 9:
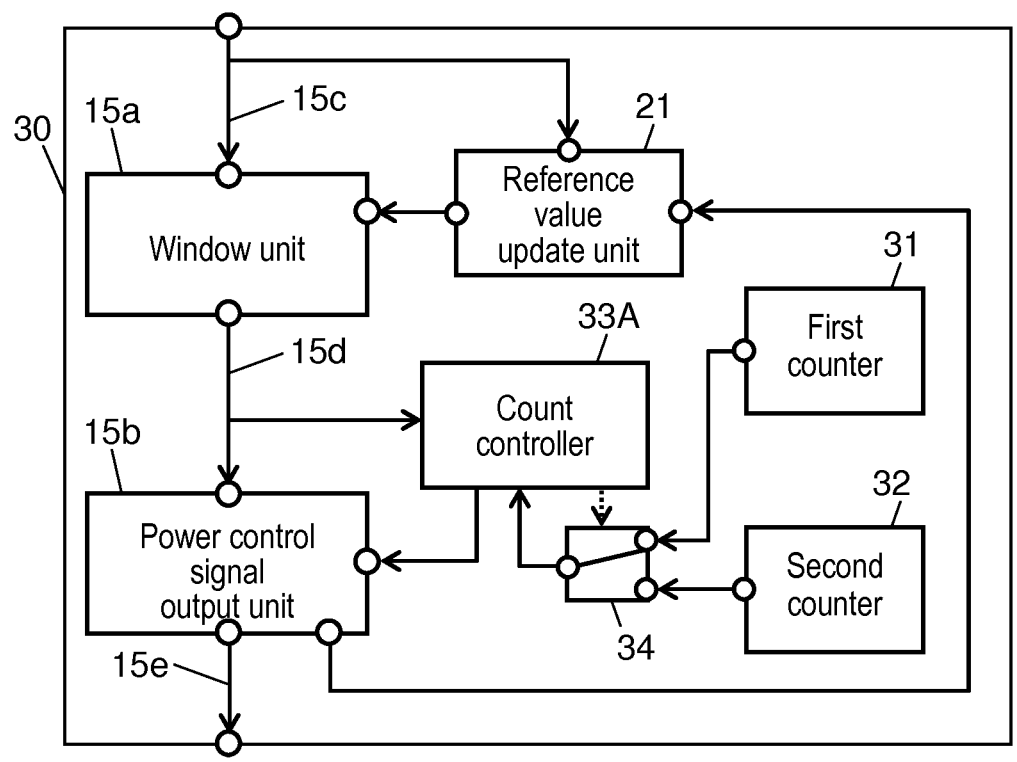
FIG. 9 is a block diagram showing a configuration of yet another power controller used in the inertial force sensor according to the first embodiment of the present invention.
Figure 10A:
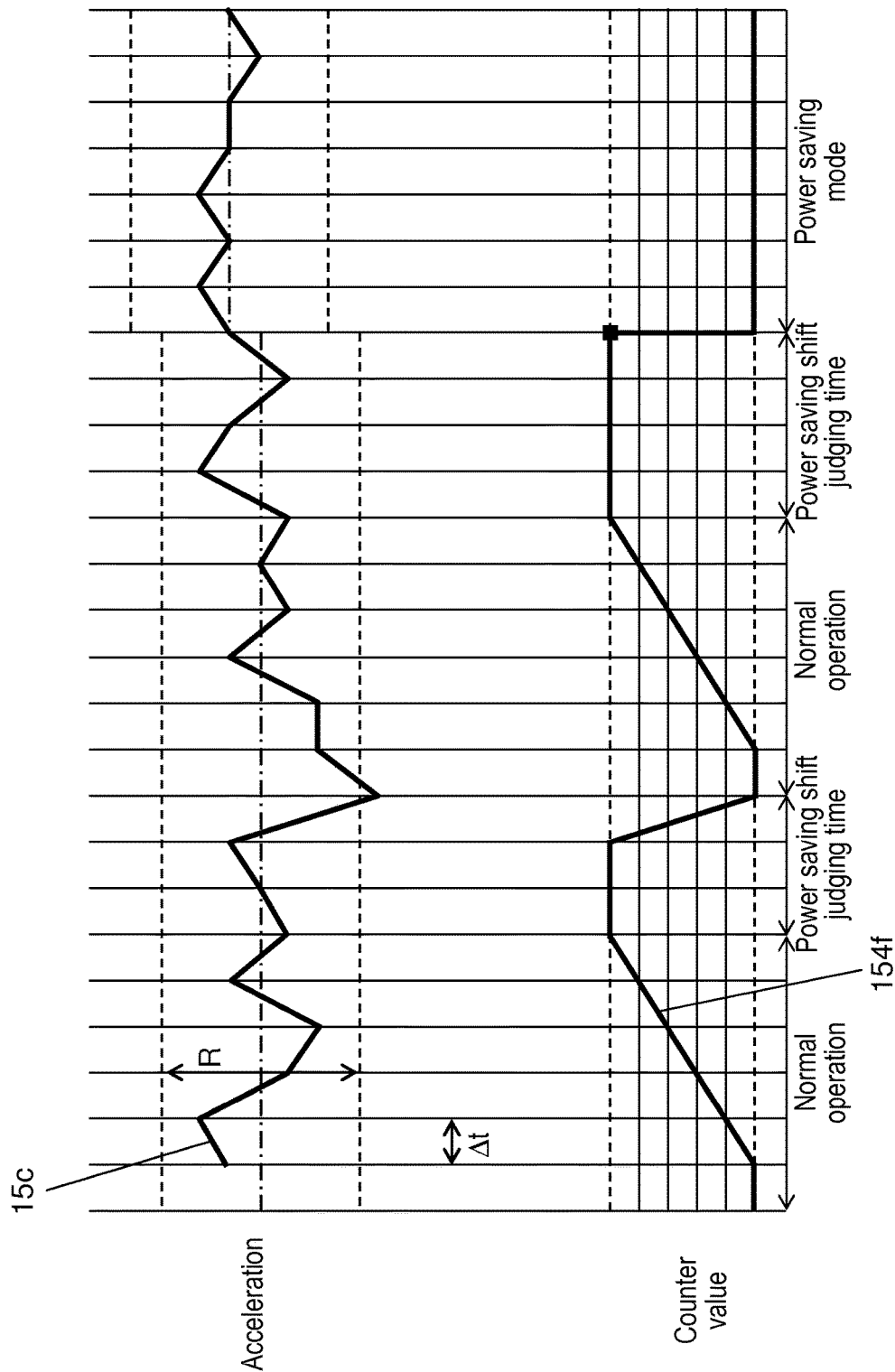
FIG. 10A is a diagram showing an example of control by a power controller used in the inertial force sensor according to the first embodiment of the present invention.

Next, in addition to the control configuration shown in FIG. 7, a method of preventing malfunction due to noises by using a counter will be described with reference to FIG. 9 to FIG. 10B. FIG. 9 shows a configuration of yet another power controller 30 according to the present embodiment. FIGS. 10A and 10B respectively show examples of control by power controller 30. In addition to the configuration shown in FIG. 5, the configuration shown in FIG. 9 is further provided with reference value update unit 21 shown in FIG. 7, and has count controller 33A instead of count controller 33.

A situation of shifting to the power saving mode is shown in FIG. 10A. Similarly to FIG. 6A, first counter 31 begins to count up when acceleration value 15c falls within range R. Then, when counter value 154f has reached the counter threshold value, count controller 33A stops counting by first counter 31, and window unit 15a judges whether or not the condition that acceleration value 15c is maintained within range R continues for a specified power saving shift judging time. Since acceleration value 15c has fallen below the lower threshold value of range R during the first power saving mode shift judging time, count controller 33A resets counter value 154f counted by first counter 31, and again begins to count up by first counter 31. Similarly to the manner as described above, if counter value 154f has reached the first counter threshold value and if acceleration value 15c is maintained within range R for the power saving shift judging time, power control signal output unit 15b changes control signal 15e to the "Low" state for shifting to the power saving mode.

That is, power controller 30 resets the number of times acceleration value 15c is within specified range R if acceleration value 15c becomes out of specified range R before first counter value 154f has reached a first specified number of times (the first counter threshold value). In this manner, by resetting counter value 154f if acceleration value 15c becomes out of range R at least once, the inertial force sensor can continue detection of angular velocity without shifting to the power saving mode even if there is a certain period of time in which the user happens not to apply acceleration to the device being in use.

Although the power saving shift judging time is provided in FIG. 10A, the first counter threshold value may be increased by a count number corresponding to the power saving shift judging time. Since first counter threshold value is 5 and the count number corresponding to the power saving shift judging time is 4 in the example shown in FIG. 10A, first counter threshold value may be set to 9 to perform a similar control. However, since first period T1 for shifting to the power saving mode is in the order of minutes as described before, the first counter threshold value becomes a much larger value in case of using the same clock signal as that of the second counter value used for judging second period T2. Therefore, first counter 31 becomes large in scale. In contrast, provision of the power saving shift judging time allows first counter 31 to be small in scale.

On the other hand, FIG. 10B shows a control example in case of shifting from the power saving mode to the normal power mode. In the power saving mode, if acceleration value 15c indicates the lower threshold value, being out of range R, count controller 33A begins to count up by second counter 32. In this case, second counter 32 counts up by 2 every Δt as described in the case shown in FIG. 6A. Then, if acceleration value 15c becomes within range R before counter value 155f reaches the counter threshold value, counter controller 33A counts down by 1 every Δt during when acceleration value 15c is within range R, instead of resetting the second counter value. Eventually, when the second counter value becomes count 8, power control signal output unit 15b changes control signal 15e to the "High" state for shifting to the normal power mode.

In other words, if acceleration value 15c falls within range R before the second counter value reaches a second specified value (the second counter threshold value), power controller 30 subtracts, from the second counter value, a value obtained by multiplying the number of times acceleration value 15c is within specified range R with a center defined by a reference value by a second natural number smaller than the natural number of 2 or more. In other words, it is preferable to make the count-down rate of the second counter value to be smaller than the count-up rate.

As described above, in a case that acceleration value falls outside range R for a short period of time, the power saving mode is maintained. Accordingly, if unintentional acceleration is generated by, for example, a contact with the device in error, the power saving mode is maintained. Further, by gradually counting down counter value 155f without resetting, it is possible to quickly shift to the normal power mode.

Also, in FIG. 10A and FIG. 10B, the reference value is updated to acceleration value 15c at the time the mode has been shifted, as a new reference value. This operation is the same as in the case of FIG. 8. In other words, if a state in which acceleration value 15c is out of specified range R with a center defined by a reference value has continued for a specified period or if a state in which acceleration value 15c is within specified range R with a center defined by reference value 16 has continued for a specified period, power controller 30 updates the reference value to the latest value of acceleration value 15c, and thereafter adopts reference value 16a.

In the foregoing description, the present embodiment has been described by using acceleration sensor element 11a as a specific example of first sensor element 11, and angular velocity sensor element 12a as a specific example of second sensor element 12. However, the present invention is not limited to the acceleration sensor and the angular velocity sensor. Combination of other inertial force sensors such, for example, as a pressure sensor, a geomagnetic sensor, and the like may be applicable. If the power consumption of first signal processor 13 connected to first sensor element 11 is smaller than the power consumption of second signal processor 14 connected to second sensor element 12, effect of largely reducing the power consumption as inertial force sensor 10 can be obtained.

As described above, according to the present embodiment, the power necessary for detecting the second inertial force can be automatically switched between the power saving mode and the normal power mode. Accordingly, such a function is not necessary that receives a mode switching signal from a host outside inertial force sensor 10. Therefore, the power at the host side and the power necessary for communications can also be eliminated.

Second Embodiment

Next, configurations to automatically switch between the normal power mode and the power saving mode in different manners from the first embodiment will be described with reference to FIG. 11 through FIG. 17.

Figure 11:
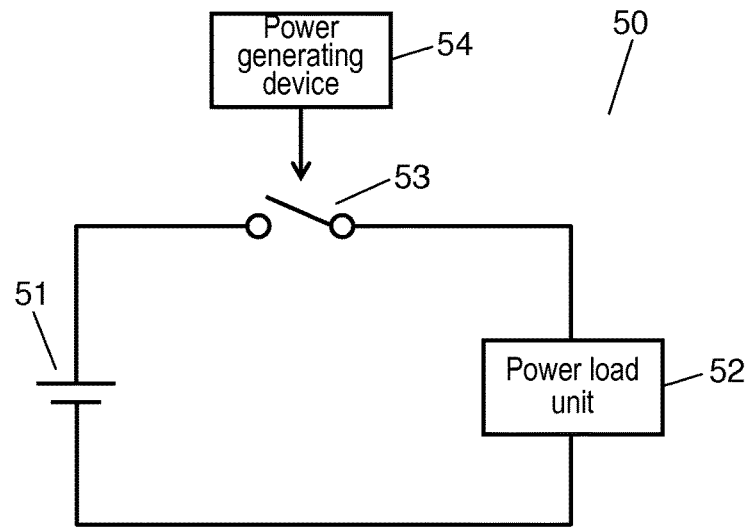
FIG. 11 is a block diagram of an electronic device according to a second embodiment of the present invention.

FIG. 11 is a block diagram of electronic device 50 according to the present embodiment. Electronic device 50 has power supply unit 51, power load unit 52, switch 53 connected to power supply unit 51 and power load unit 52 therebetween, and power generating device 54 for controlling switch 53. Power generating device 54 converts environmental energy given to electronic device 50 to electrical energy, and controls switch 53 based on the electrical energy. With this configuration, it is possible to reduce the standby power of electronic device 50 in a power saving mode to zero or a much smaller level compared to the conventional devices, and to stably control restoration from the power saving mode to a normal power mode.

Specifically, for example, switch 53 has a short-circuit state and a cutoff state, and when switch 53 is in the cutoff state, power generating device 54 turns switch 53 to the short-circuit state based on the electrical energy. In this case, the standby power of electric device 50 in the power saving mode can be reduced to zero.

In other words, power load unit 52 has two power states—the normal power mode and the power saving mode, and power generating unit 54 controls power load unit 52. Power generating device 54 converts environmental energy given to electronic device 50 to electrical energy, and controls the power state based on this electrical energy. When the power state is the power saving mode, power generating device 54 changes the power state to the normal power state based on the electrical energy.

Figure 12:
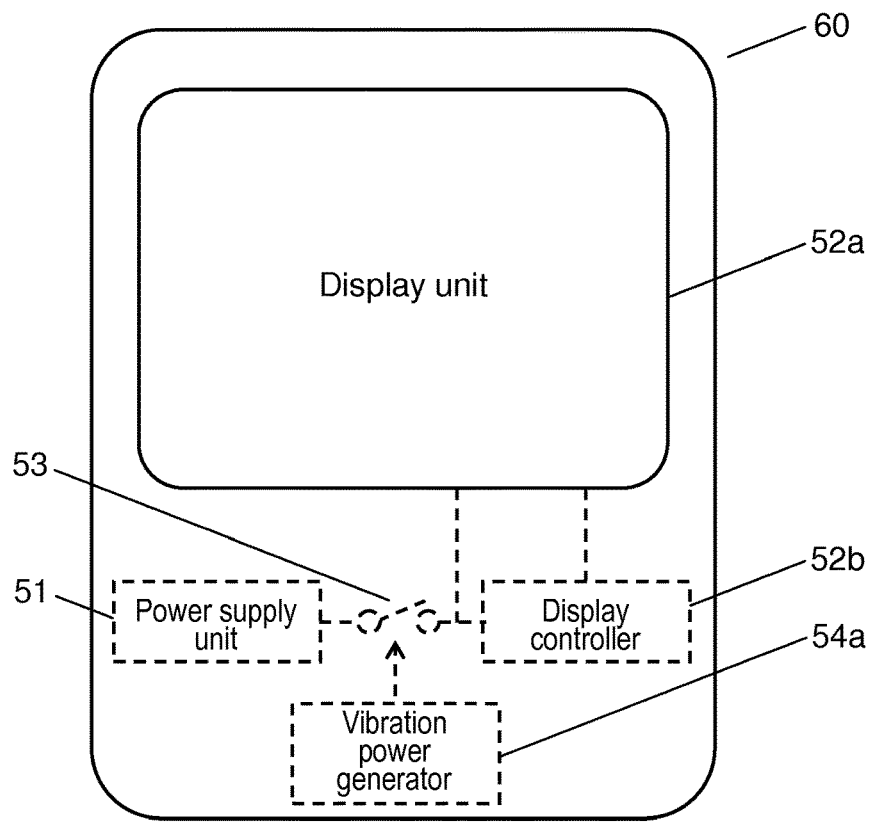
FIG. 12 is a block diagram of a mobile terminal which is an example of the electronic device shown in FIG. 11.

FIG. 12 is a block diagram of mobile terminal 60 which is an example of electronic device 50. Mobile terminal 60 has power supply unit 51, display unit 52a, display controller 52*b* for controlling display unit 52*a*, switch 53, and vibration power generator 54*a*. Display unit 52*a* and display controller 52*b* correspond to power load unit 52 in FIG. 11, and vibration power generator 54*a* corresponds to power generating device 54.

When mobile terminal 60 is placed on a desk or shelf in a non-used state, it becomes in a power saving mode by cutting or limiting power supply to display unit 52*a* and display controller 52*b*. In this state, when mobile terminal 60 is picked up by the user, mobile terminal 60 causes oscillation. Vibration power generator 54*a* converts mechanical energy caused by this oscillation to electrical energy. Switch 53 is short-circuited by this electrical energy, so that power from power supply unit 51 is supplied to display unit 52*a* and display controller 52*b*. As a result, mobile terminal 60 shifts to a normal power mode.

Figure 13:
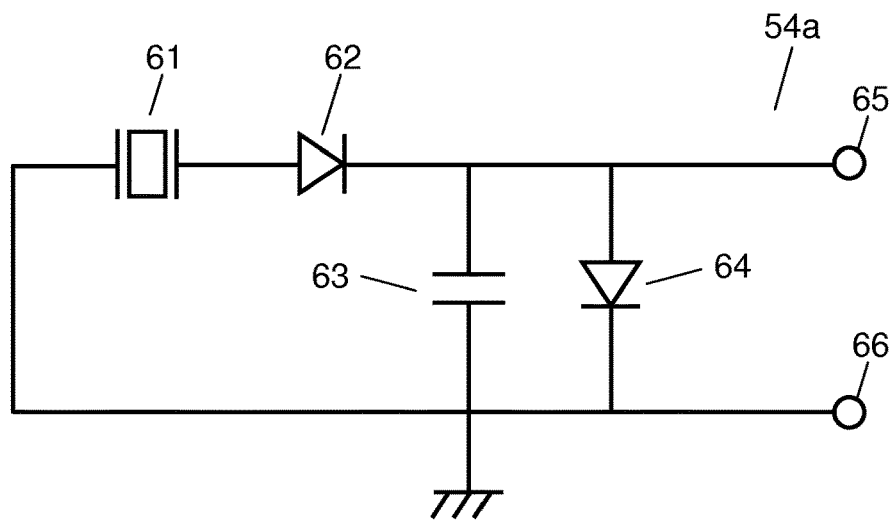
FIG. 13 is a circuit diagram of a power generating device used in the mobile terminal shown in FIG. 12.

FIG. 13 is a circuit diagram of vibration power generator 54*a*, which is an example of power generating device used in mobile terminal 60 shown in FIG. 12. Vibration power generator 54*a* has vibration power generating element 61, output terminal 65, reference terminal 66, diodes 62 and 64, and capacitor 63. Diode 62 is electrically connected between vibration power generating element 61 and output terminal 65. Capacitor 63 and diode 64 are electrically connected in parallel to each other between vibration power generating element 61 and reference terminal 66.

In this configuration, vibration power generating element 61 generates electromotive force by an oscillation given to vibration power generator 54*a*. Electric charges are charged in capacitor 63 by this electromotive force, so that a specified voltage is generated between output terminal 65 and reference terminal 66. By this specific voltage, vibration power generator 54*a* short-circuits switch 53 shown in FIG. 12.

Types of vibration power generating are roughly classified according to their principle to electromagnetic type, electrostatic type and piezoelectric type. The electromagnetic type generates induced electromotive force by changes in magnetic flux caused by moving a magnet into and out of a winding coil. This type is high in power generation efficiency, but is unsuitable to reduction in size and thickness due to the use of the winding coil. The electrostatic type generates changes in voltage by changes in electrostatic capacitance caused by varying opposing areas of confronting electrodes. The piezoelectric type uses electric charges generated by stress to generate a voltage proportional to the stress. Any of these types may be used as vibration power generating element 61, but it is advantageous for producing a small-sized element to use the electrostatic type or the piezoelectric type.

In the above description, switch 53 is short-circuited by using the electrical energy generated by power generating device 54 so as to supply power to power load unit 52. Under this control, electronic device 50 shifts from the power saving mode to the normal power mode. Other than such control, the power supply supplied to power load unit 52 may be cut. For example, in case that electronic device 50 is an alarm clock and power load unit 52 is an alarm, when the alarm of the alarm clock placed on a floor is sounding, it is possible to cut power supply to the alarm by detecting the quantity of power generated when the user lifts the alarm clock. That is, when switch 53 is in the short-circuit state in the configuration shown in FIG. 11, power generating device 54 may turn switch 53 to the cutoff state based on the electrical energy. In other words, when the power state is in the normal power mode, power generating device 54 may shift the power state to the power saving mode based on the electrical energy.

Figure 14:
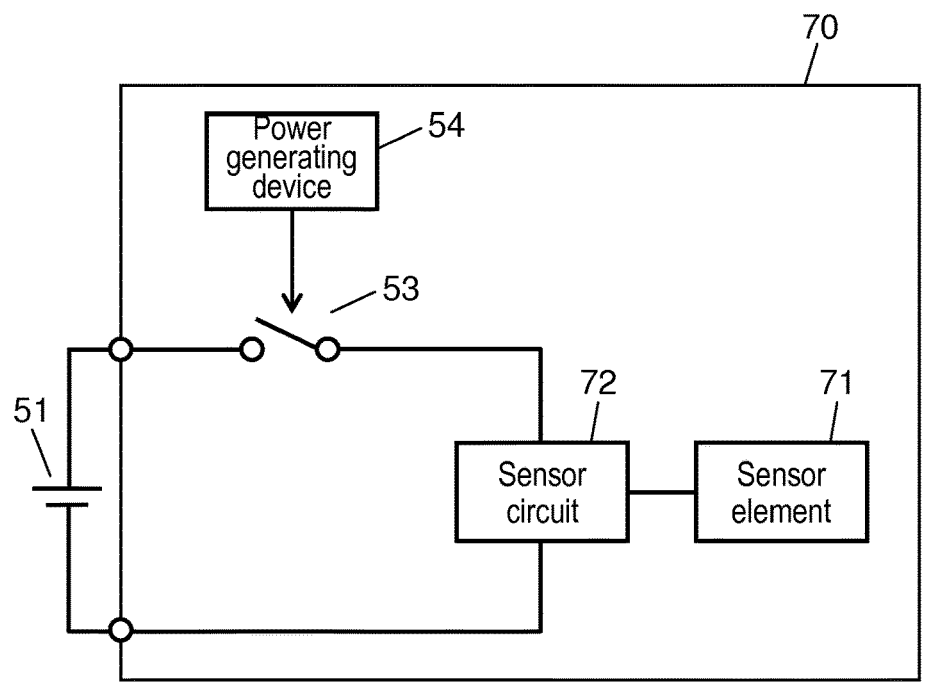
FIG. 14 is a block diagram of a sensor device which is an example of the electronic device shown in FIG. 11.

Next, a case in which the configuration shown in FIG. 11 is applied to a sensor device will be described with reference to FIG. 14 to FIG. 16. FIG. 14 is a block diagram of sensor device 70 which is an example of electronic device 50.

Sensor device 70 has sensor element 71, sensor circuit 72 connected to sensor element 71, switch 53, and power generating device 54 for controlling switch 53. Switch 53 is connected to sensor circuit 72 and power supply unit 51 therebetween. Power supply unit 51 is provided outside. Sensor element 71 and sensor circuit 72 correspond to power load unit 52 shown in FIG. 11.

Sensor device 70 is an electronic component mounted inside a mobile terminal or the like. It is possible to reduce power consumption of not only a set product like the mobile terminal, but also each electronic component, by controlling a normal power mode and a power saving mode.

In the same manner as that in mobile terminal 60 shown in FIG. 12, vibration power generator 54*a*, that generates power by oscillation, can be used as power generating device 54.

Sensor device 70 is an inertial force sensor such as acceleration sensor, angular velocity sensor and angular acceleration sensor. Such an inertial force sensor detects an inertial force applied to a mobile terminal in a case, for example, that the user moves the mobile terminal. Accordingly, when the mobile terminal having sensor device 70 mounted inside is placed on a desk or a shelf in a non-used state, sensor device 70 is in the power saving mode.

When the user picks up the mobile terminal in the condition that sensor device 70 is in the power saving mode, sensor device 70 oscillates, and power generating device 54 converts mechanical energy generated by this oscillation to electrical energy. By this electrical energy, power generating device 54 short-circuits switch 53 to allow power from power supply unit 51 to be supplied to sensor circuit 72, so that sensor device 70 shifts to the normal power mode.

In the power saving mode, sensor circuit 72 may be partially energized without completely cutting off power supply from power supply unit 51 to sensor circuit 72. This makes it possible to increase the restoration speed from the power saving mode to the normal power mode.

Figure 15:
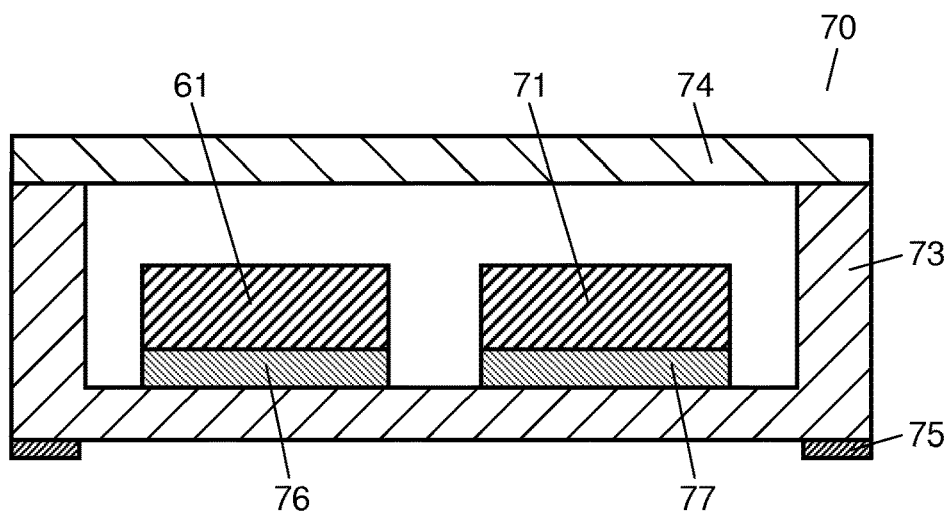
FIG. 15 is a schematic sectional view of the sensor device shown in FIG. 14.

FIG. 15 is a schematic sectional view of sensor device 70. In sensor device 70, vibration power generating element 61 constituting power generating device 54 is adhered through elastic member 76 to a recessed portion of package 73. Sensor element 71 is adhered through elastic member 77 to the recessed portion of package 73. Upper lid 74 covers and seals the recessed portion. It should be understood that illustration of sensor circuit 72 and switch 53 is omitted in FIG. 15. Also, power supply unit 51 provided outside is connected to sensor circuit 72 and switch 53 through terminals 75.

In this configuration, Young's modulus of elastic member 76 is greater than Young's modulus of elastic member 77. Sensor element 71 is adhered to package 73 with elastic member 77 having a smaller Young's modulus to prevent oscillation applied to the mobile terminal from being transmitted through package 73 to sensor element 71. On the other hand, it is preferable that the oscillation applied to the mobile terminal is efficiently transmitted to vibration power generating element 61. Therefore, vibration power generating element 61 is adhered to package 73 with elastic member 76 having a large Young's modulus. For example, an epoxy resin adhesive can be used as elastic member 76, and a silicon adhesive can be used as elastic member 77.

Figure 16:
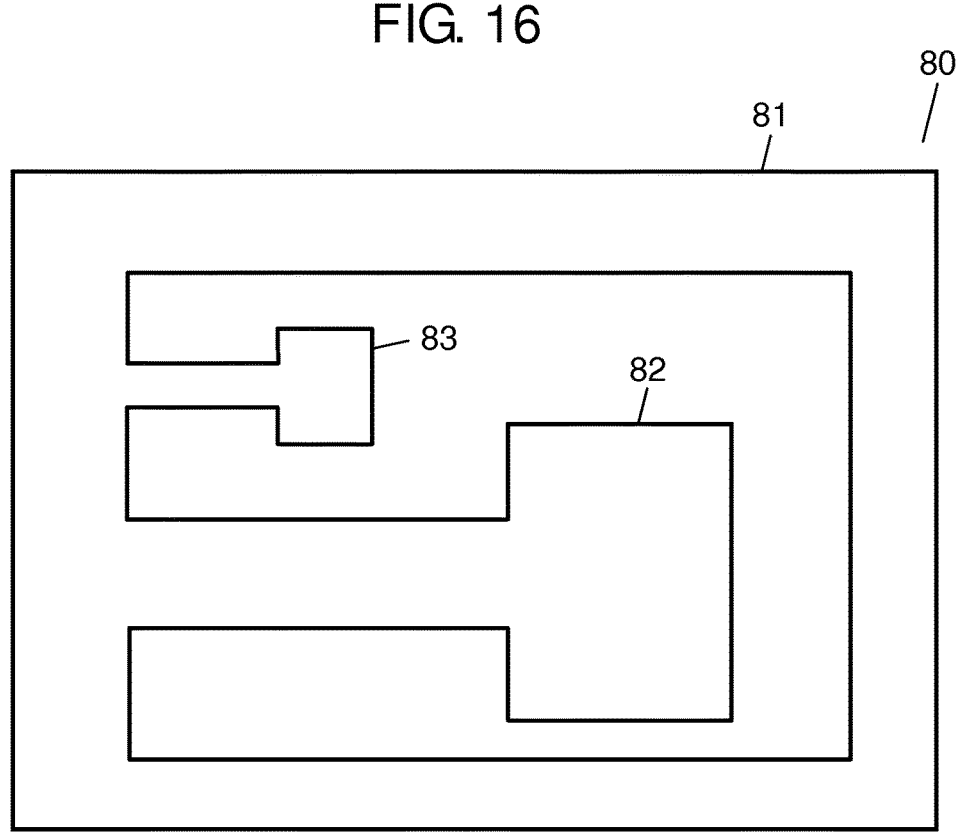
FIG. 16 is a plan view of a composite element applicable to the sensor device shown in FIG. 14.

FIG. 16 is a plan view of a composite element applicable to the sensor device shown in FIG. 14. In composite element 80, sensor element 71 and vibration power generating element 61 are formed integrally. Composite element 80 has sensor element portion 82 and power generating element portion 83 both connected to frame 81 in a cantilever manner. It should be understood that this example cannot be applied to the configuration shown in FIG. 15. In this example, sensor element portion 82 detects acceleration. The resonant frequency of sensor element portion 82 is different from the resonant frequency of power generating element portion 83. The resonant frequency of power generating element portion 83 is set to approximately the same as the resonant frequency of the entire sensor device 70 or the entire mobile terminal in which sensor device 70 is mounted. By forming sensor element 71 and vibration power generating element 61 integrally in this manner, sensor device 70 can be small-sized.

Also, by forming sensor circuit 72 connected to sensor element portion 82 and the power generating circuit (see, FIG. 13) connected to vibration power generating element 61 on the same integrated circuit, sensor device 70 can be further small-sized.

Figure 17:
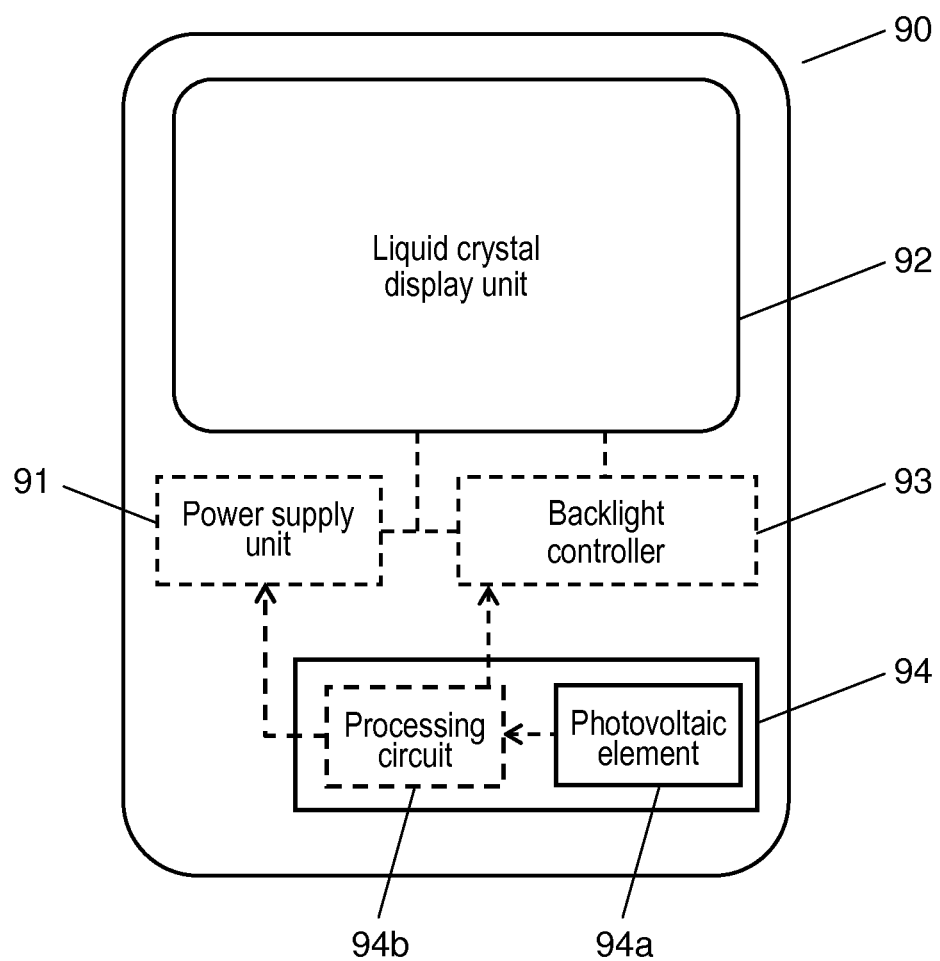
FIG. 17 is a block diagram of another mobile terminal which is an example of the electronic device shown in FIG. 11.

Next, an example of application to mobile terminal 90 different from the one shown in FIG. 12 will be described with reference to FIG. 17. FIG. 17 is a block diagram of mobile terminal 90 which is an example of the electronic device shown in FIG. 11.

Mobile terminal 90 has power supply unit 91, liquid crystal display unit 92, backlight controller 93 for controlling the intensity of the backlight of liquid crystal display unit 92, and power generating device 94. Power supply unit 91 is a secondary battery such as a lead-acid battery or a lithium-ion battery, and supplies power to liquid crystal display unit 92 and backlight controller 93. Liquid crystal display unit 92 and backlight controller 93 correspond to power load unit 52 shown in FIG. 11. Power generating device 94 replenishes power to power supply unit 91, and also controls backlight controller 93.

Power generating device 94 has photovoltaic element 94a, and processing circuit 94b connected to photovoltaic element 94a. Power generating device 94 converts solar energy to electrical energy by photovoltaic element 94a to replenish power to power supply unit 91, and controls backlight controller 93 based on this electrical energy. That is, processing circuit 94b doubles the function of switch 53 shown in FIG. 11.

Backlight controller 93 increases the intensity of the backlight of liquid crystal display unit 92 in a dark place to brighten the display, and reduces the intensity of the backlight of liquid crystal display unit 92 in a bright place to reduce power consumption. Since photovoltaic element 94a generates more electrical energy in a brighter place, backlight controller 93 is controlled so that the intensity of the backlight becomes inversely proportional to this electrical energy. With this configuration, it is possible, based on the electrical energy obtained by power generating device 94, not only to replenish power, but also to control the power state of the backlight of liquid crystal display unit 92, so that the power consumption of mobile terminal 90 can be reduced.

Alternatively, as a manner contrary to the above, backlight controller 93 may reduce the intensity of the backlight of liquid crystal display unit 92 in a dark place to reduce power consumption, and increase the intensity of the backlight of liquid crystal display unit 92 in a bright place. In this case, since photovoltaic element 94a generates more electrical energy in a brighter place, backlight controller 93 is controlled so that the intensity of the backlight becomes proportional to the electrical energy. In this manner, it is possible to improve visibility of liquid crystal display unit 92 in a place surrounded by bright backgrounds, and also to suppress discharge of power supply unit 91 in a dark area in which photovoltaic element 94a cannot generate power.

Although, in FIG. 17, mobile terminal 90 has been described as an example of electronic device, this configuration may be applied to other electronic devices such, for example, as cameras or remote controllers.

The inertial force sensor according to the present invention can autonomously perform shift to a power saving mode and restoration to a normal power mode, without requiring a restoration operation by the user or an external circuit. Accordingly, the inertial force sensor according to the present invention is useful as an inertial force sensor to be used in digital cameras, mobile terminals, robots, and various other electronic devices.

The invention claimed is:

1. An inertial force sensor comprising:
a first sensor element configured to convert an acceleration to an electric signal;
a second sensor element configured to convert an angular velocity to an electric signal;
a first signal processor connected to the first sensor element and configured to output an acceleration value;
a second signal processor connected to the second sensor element and configured to output an angular velocity value; and
an output unit operable to:
output a first control signal when the acceleration value is within a specified range for a first period, and
output a second control signal when the acceleration value is outside of the specified range for a second period,
wherein the output unit is configured such that the second period is larger than zero and shorter than the first period.

2. The inertial force sensor according to claim 1, wherein, the first control signal shifts the inertial force sensor from a normal power mode to a power saving mode, and
the second control signal shifts the inertial force sensor to the normal power mode from the power saving mode.

3. The inertial force sensor according to claim 2, wherein, the output unit operable to prolong the first period during a certain period of time after shifted from the power saving mode to the normal power mode.

4. The inertial force sensor according to claim 2, wherein, a power supply to the second signal processor during the power saving mode is lower than a power supply to the second signal processor during the normal power mode.

5. The inertial force sensor according to claim 1, wherein, the first period is in a minute order, and the second period is in a microsecond order.

6. The inertial force sensor according to claim 1, wherein, the first period and the second period can be made externally settable.

7. The inertial force sensor according to claim 1, wherein, a center of the specified range is defined by a reference value.

8. The inertial force sensor according to claim 7, wherein, the output unit is operable to update the reference value.

9. The inertial force sensor according to claim 8, wherein, the output unit updates the reference value when the acceleration value is out of the specified range for the first period.

10. The inertial force sensor according to claim 1, wherein,
the second signal processor has a driver and a detector,
wherein the driver outputs a drive signal to cause a drive vibration of the second sensor element, and receives a monitor signal from the second sensor element, and wherein the detector detects a detection signal generated due to a displacement of the second sensor element, and integrates the detected signal by a low-pass filter to produce an angular velocity value.

11. An inertial force sensor comprising:

a first sensor element configured to convert an acceleration to an electric signal;

a second sensor element configured to convert an angular velocity to an electric signal;

a first signal processor connected to the first sensor element and configured to output an acceleration value; and a second signal processor connected to the second sensor element and configured to output an angular velocity value;

a first unit operable to receive the acceleration value and output a status signal; and a second unit operable to output a first control signal when the status signal indicating a stationary state is input for a first period, and output a second control signal when the status signal indicating an operating state is input for a second period, wherein the second unit is configured such that the second period is larger than zero and shorter than the first period.

12. The inertial force sensor according to claim 11, wherein, the first control signal shifts the inertial force sensor from a normal power mode to a power saving mode, and the second control signal shifts the inertial force sensor to the normal power mode from the power saving mode.

13. The inertial force sensor according to claim 12, wherein, the output unit operable to prolong the first period during a certain period of time after shifted from the power saving mode to the normal power mode.

14. The inertial force sensor according to claim 12, wherein, a power supply to the second signal processor during the power saving mode is lower than a power supply to the second signal processor during the normal power mode.

15. The inertial force sensor according to claim 11, wherein, the first period is in a minute order, and the second period is in a microsecond order.

16. The inertial force sensor according to claim 11, wherein, the first period and the second period can be made externally settable.

17. The inertial force sensor according to claim 11, wherein, the first unit outputs the status signal indicating the stationary state when the acceleration value is within a specified range, and outputs the status signal indicating the operating state when the acceleration value is outside the specified range.

18. The inertial force sensor according to claim 17, wherein, a center of the specified range is defined by a reference value, and the output unit is operable to update the reference value.

19. The inertial force sensor according to claim 18, wherein, the output unit updates the reference value when the acceleration value is out of the specified range for the first period.

20. The inertial force sensor according to claim 11, wherein, the second unit is operable to:

output the first control signal when the status signal indicating stationary signal is continuously input for the first period, and output the second control signal when the status signal indicating the operating state is continuously input for the second period.

* * * * *